(12) United States Patent
Chan et al.

(10) Patent No.: US 7,802,173 B2
(45) Date of Patent: Sep. 21, 2010

(54) METHOD TO DECODE A DATA STRING

(75) Inventors: Choon Meng Chan, Singapore (SG);
Hin Soon Choo, Singapore (SG); Song Yong Chia, Singapore (SG)

(73) Assignee: Thomson Licensing, Boulogne-Billancourt (FR)

( * ) Notice: Subject to any disclaimer, the term of this patent is extended or adjusted under 35 U.S.C. 154(b) by 1017 days.

(21) Appl. No.: 10/553,699

(22) PCT Filed: Mar. 10, 2004

(86) PCT No.: PCT/EP2004/002429

§ 371 (c)(1),
(2), (4) Date: Sep. 8, 2006

(87) PCT Pub. No.: WO2004/093376

PCT Pub. Date: Oct. 28, 2004

(65) Prior Publication Data

US 2007/0100819 A1  May 3, 2007

(30) Foreign Application Priority Data

Apr. 17, 2003  (EP) .................................. 03290963

(51) Int. Cl.
*G06F 7/02* (2006.01)
(52) U.S. Cl. .................. 714/819; 455/404.1; 455/404.2
(58) Field of Classification Search ................. 714/819; 704/500; 340/539.1, 286.02; 348/461, 473; 455/404.1, 404.2; 725/23
See application file for complete search history.

(56) References Cited

U.S. PATENT DOCUMENTS

| 5,121,430 A * | 6/1992 | Ganzer et al. ................ 380/258 |
| 6,204,761 B1 * | 3/2001 | Vanderable ............ 340/539.28 |
| 6,323,767 B1 | 11/2001 | Gropper |
| 6,449,254 B1 | 9/2002 | Hadjiahmad |
| 6,535,164 B2 * | 3/2003 | Imazeki et al. ......... 342/357.17 |
| 6,636,832 B1 * | 10/2003 | Li .............................. 704/500 |

OTHER PUBLICATIONS

Burgan, Richard, A Proposal for error control in SAME coded EAS and NWR messages, Mar. 14, 1999 http://wc8j.net/nwrsame/SAMEproposal.html.*
Anonymous: "NWR Specific Area Message Encoding (SAME) 4.43", NOAA Weather Radio, "Online", Jul. 13, 1999.
Search Report Dated Aug. 12, 2004.

* cited by examiner

*Primary Examiner*—Sam Rizk
(74) *Attorney, Agent, or Firm*—Robert D. Shedd; Joseph J. Opalach; Brian J. Cromarty

(57) ABSTRACT

The invention relates to decode data transmitted via US National Weather Service NOAA Weather Radio (NWR) transmitters or any other data transmitted in a comparable way. According to the invention a method to decode a received data string comprises the steps of locating a predefined significant part of the data string, disregarding an insignificant part of the data string, and further checking only the located significant part of the data string. Decoding according to the proposed algorithm is very reliable.

10 Claims, 4 Drawing Sheets

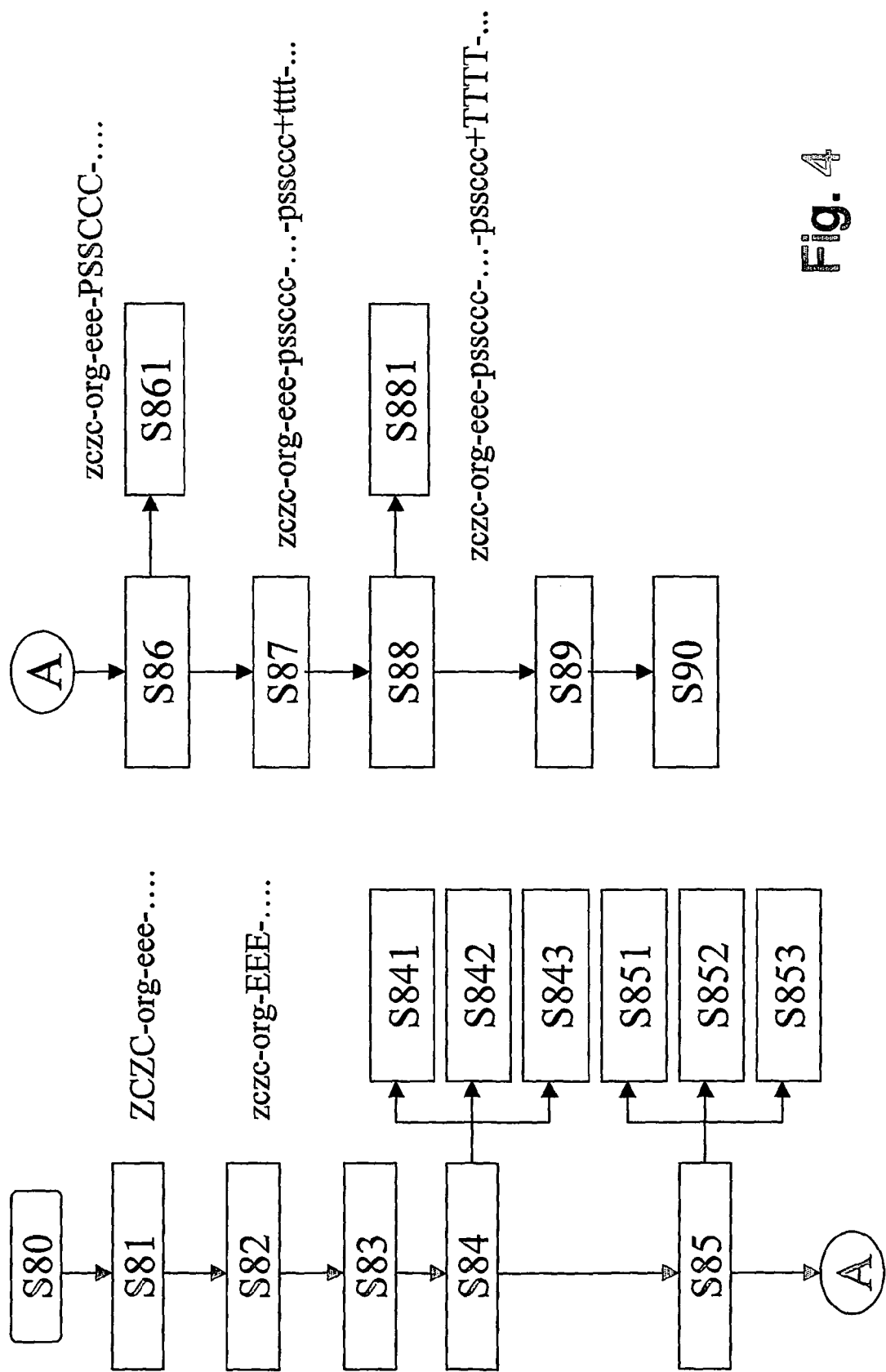

METHOD TO DECODE A DATA STRING

The invention relates to decode data transmitted via US National Weather Service NOAA Weather Radio (NWR) transmitters or any other data transmitted in a comparable way. Decoding according to the proposed algorithm is very reliable.

BACKGROUND OF THE INVENTION

The data format as used for transmitting data via US National Weather Service NOAA Weather Radio (NWR) is for example described in the publication "NATIONAL WEATHER SERVICE—NOAA WEATHER RADIO (NWR) TRANSMITTERS—NWR SPECIFIC AREA MESSAGE ENCODING—NWR SAME", Update #4.43 of Jul. 13, 1999. Background, details and examples of the NWR SAME system and data transmitted according to this system are described therein and are not repeated here in detail except when regarded helpful to understand the invention. In other countries or regions similar systems are being installed or tested, for which similar solutions as described herein may apply. For example in Germany the DCF77 time signal transmission is currently under development to also include a data string for weather or other warning functions.

According to NOAA SAME a typical string format is:
"ZCZC-WXR-EEE-PSSCCC-PSSCCC+TTTT-JJJH-HMM-LLLLLLLL-"

Therein ZCZC is a header code block, a dash "-" is present between two code blocks, except prior to a message valid time, WXR identifies the organization transmitting the message (sometimes WXR is also referred to by ORG), EEE identifies the type of event, PSSCCC is the location data, TTTT is the duration data which identifies the time duration after the issue time for which the message is valid, JJJHHMM identifies calendar date and time, and LLLLLLLL identifies the originator of the message. There may be a single or several location data blocks, in the example two such blocks are shown.

This string is repeated three times with a pause after each string, and followed by further information. The latter may differ in length. Due to varying transmission conditions data may be corrupted at any location of the transmitted strings. In order to prevent a corrupted string to cause an erroneous warning or other action, code error checking is to be performed by the receiving device. The document regarding NOAA SAME mentioned above recommends performing a routine check as to whether at least two of the three strings are identical before a valid transmission is assumed. If this test fails, a bit-by-bit check of the three consecutively received strings is recommended, whereby only these bits are accepted as valid which appear identical in two of the three strings.

It is an object of the invention to improve the error checking process.

BRIEF SUMMARY OF THE INVENTION

According to the invention a method to decode a received data string comprises the steps of locating a predefined significant part of the data string, disregarding an insignificant part of the data string, and further checking only the located significant part of the data string. This has the advantage that errors due to corruption in insignificant parts of the data string do no longer jeopardize retrieval of the significant parts. Of course, if all three subsequently received data strings are identical, no further action regarding error detection and correction is necessary. Also, if the three data strings are identical after disregarding the insignificant part, no such further action is necessary. Insignificant parts may either be removed before or they are skipped in the error checking and correction process, or disregarded in another appropriate way.

The inventive method further comprises the steps of determining the length of said string, pinpointing predetermined data positions using said length, and removing data from said string starting from a position determined by said length. The invention takes advantage from the fact that only the starting part of each data string contains significant data. When the length of the starting part is determined, the following part is disregarded. As there are different numbers of location information provided for, the length of the starting part is not always the same, depending on the number of regions for which the message is relevant.

According to the invention the determining step consists in locating a predetermined sequence in said string. Advantage is taken that each string contains predefined symbols at predefined position. The bit sequence of such symbol is thus used to determining the length, which is correlated to the position of said predefined sequence. Preferably, said sequence refers to the symbol "+" having a predefined location according to NWR SAME specification. Of course, also the sequence of predefined symbols is preferably evaluated. For example the distances between the symbols "-" and "+" are predefined according to NWR SAME specification, so that a match of these distances gives the length of the string, even if not all of the symbols "-" or "+" can be retrieved at their respective positions.

Advantageously the method further comprises the steps of byte-by-byte comparison of different strings that are assumed to contain identical data, and taking as correct data those bytes for which said comparison gives the result "identical". This has the advantage that the significant parts are reliably checked. Especially when the comparison is based on more than two strings, the correct data is determined by majority vote. This has the advantage over a bit-by-bit comparison as of NWR SAME recommendation that only bytes, i.e. units of bits that belong together are compared thus reducing the risk of generating an artificial symbol consisting of bits that are identical in changing pairs of data strings only, thus being meaningless.

Preferably the method according to the invention comprises the further steps of locating a predefined important segment of the remaining data strings as significant part, disregarding the data locations that do not belong to said important segment, and further checking only the important segments. This has the advantage that errors in less important data locations are not being dealt with and only the more important locations are taken into account. Advantageously this step is repeated by excluding more and more of the less important segments until only the most important segment remains to be checked. That means that, step by step, less information will be left over. However, the selection assures that only the more important information is further treated, while it is accepted that less important information is disregarded. Overall it is more important for the user to receive the more important information reliable than either no information or unreliable information. It might be, for example, more important to know that a warning message for a certain area was issued, rather than to know by whom it was issued.

Advantageously it is searched for the most logical data in case that no correct data can be determined. This has the advantage that, despite non-existing majority vote between the three strings for significant parts thereof, correct data is detected based on further characteristics of the significant parts. From the three different bytes at a certain location of the three respective strings, the one is selected that falls into an allowable range, e.g. because it belongs to a group of bytes that are not forbidden to be put at this respective position.

According to another aspect of the invention it is searched for a predefined header code block, and if no such header code block is found an artificial header code block is attached at the start of the received data string. This has the advantage that, for locating the significant part, optimized starting conditions are generated in case that a leading portion of the received data stream contains errors. Further checking possibility is thus improved.

Advantageously it is checked for a predetermined set of symbols at a predetermined location of the data string, and if these are located at a different position symbols are inserted to or removed from the data string so as to shift the predetermined set of symbols to its predetermined location. This, too, leads to even more optimized starting conditions for further evaluation steps and increases the further checking possibility.

A device for performing a method according to the invention as well as a broadcast receiver equipped with such device or else being provided for performing such method lies also within the inventive concept. Respective devices are advantageously connectable to existing equipment in a household, in order to submit warning information to the users via a TV set, other video equipment, audio equipment or the like. Broadcast receivers are TV sets or radio sets as well as other audio and/or video equipment, stationary or mobile, being provided for receiving respective warning messages.

Further details and advantages of the invention will become apparent from the following description of embodiments and the related figures.

BRIEF DESCRIPTION OF THE SEVERAL VIEWS OF THE DRAWINGS

FIG. 4 shows a flowchart of a second implementation of the inventive method

DETAILED DESCRIPTION OF THE INVENTION

Figure 1:
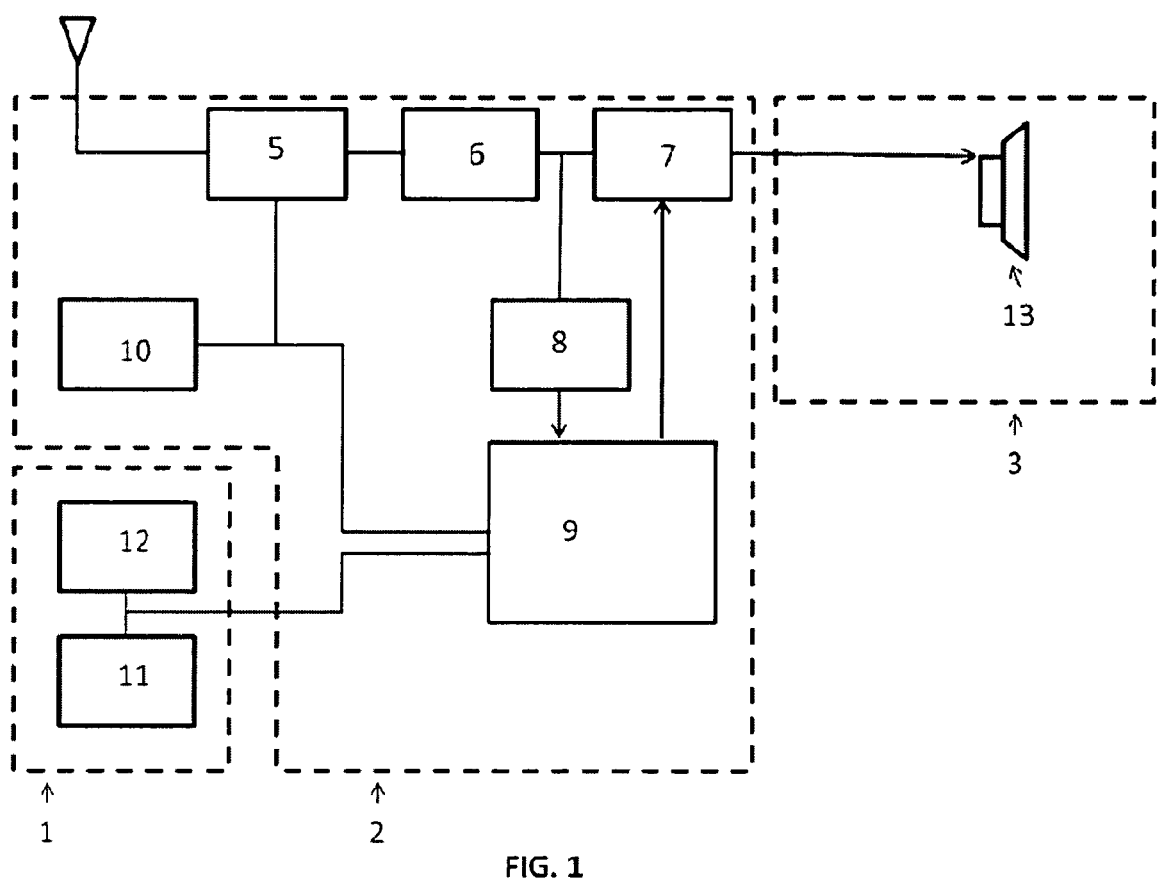
FIG. 1 shows a block diagram of a device for performing the inventive method

FIG. 1 shows the block diagram of a device for performing the inventive method. The user interface module 1, a decoder module 2 and an output device 3 are shown. A broadcast signal is received via Antenna 4 and supplied to a tuner 5. An audio demodulator 6 outputs an audio signal AU to an audio mixer 7 as well as to a frequency shift key demodulator 8. Demodulator 8 outputs a lock detect signal Q and a data signal SAME. Signals Q and SAME are input to micro controller unit 9. Micro controller unit 9 decodes the received data signal SAME and stores decoded data in non volatile memory 10, outputs an audio warning signal AUW to audio mixer 7 and outputs status information SI to user interface module 1. Light emitting diodes 11 are activated in response to status information SI in order to indicate different alert categories. Buttons 12 are provided for giving commands to the micro controller unit 9, e.g. for outputting previously received information from memory 10 or more detailed information via output device 3. Output device 3 is depicturted as comprising a loudspeaker 13 but it may as well be a television device. The decoding process as performed by micro controller unit 9 is described in more detail below.

Figure 2:
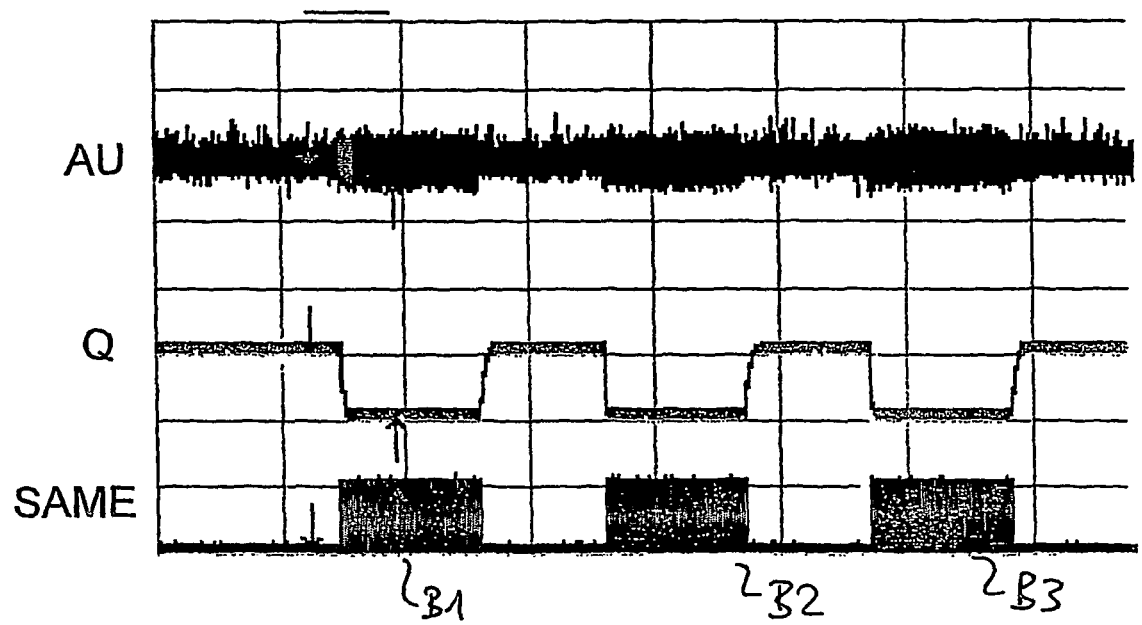
FIG. 2 shows an example of received signals
Figure 3:
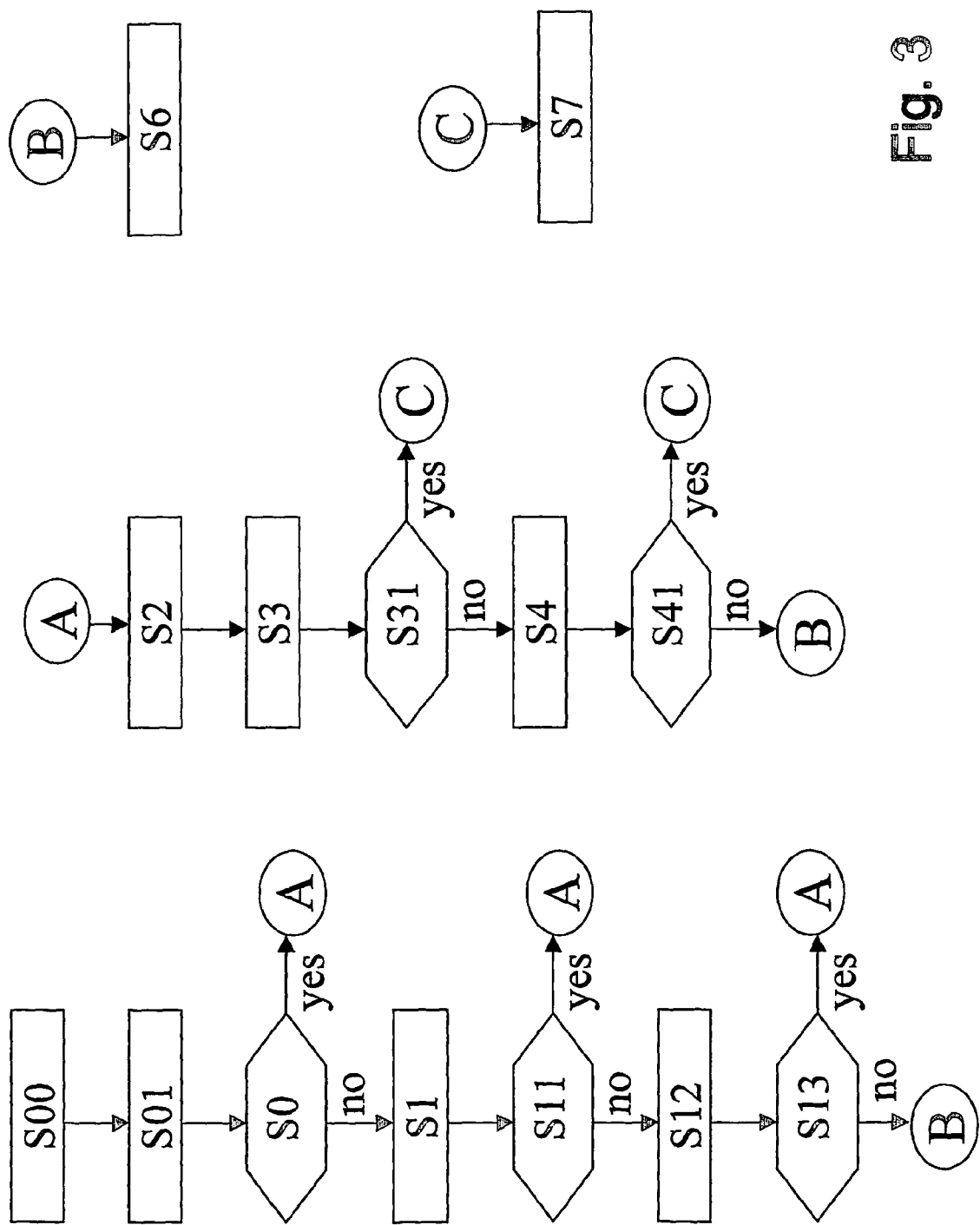
FIG. 3 shows a flowchart of a first implementation of the inventive method.

FIG. 2 shows an example of received signals. The horizontal axis is the time axis. In the upper part of FIG. 2 an audio signal AU is shown. Below this the lock detect signal Q indicates the time windows when the data signal SAME is received. This data signal SAME is shown in the lower part of FIG. 2. The data signal SAME consists of 3 bursts B1, B2, B3, each representing a data string.

Three signal bursts B1, B2, B3 with a data string of the form

"ZCZC-WXR-EEE-PSSCCC-PSSCCC+TTTT-JJJH-HMM-LLLLLLLL-" are received consecutively and are all captured in step S00 before decoding. That means there are three strings of data to be evaluated. Corruption can happen anywhere along the string. Usually, if corruption happens at a certain location N, all the remaining N+1, +2, +3 . . . data are corrupted as well. The inventive method, in the following referred to also as software, therefore disregards data that is not significant. Most significant or important are deemed the data PSSCCC for location and the data TTTT for duration and the data EEE for event.

In step S01 it is made sure for every string that is received that the received string is beginning with a sequence "ZCZC-". A string that does not have this header sequence is lacking a proper starting point. In such case the sequence "ZCZC-" is inserted to construe a proper string for further comparison. After that it is tried to extract the valid event code from the received string. The valid event code position is shifted up or down to reconstruct the string. Eventually the reconstructed string will always start with a sequence "ZCZC-QQQ-EEE- . . . ", wherein here the originator of the message is indicated by QQQ instead of WRX or ORG as mentioned somewhere else in this document. As this information is not regarded as very significant, any characters may be present there without influencing the further evaluation of the string.

In the following, String_1 refers to data collected from the 1st burst B1, String_2 refers to data collected from the 2nd burst B2 and String_3 refers to data collected from the 3rd burst B3. The method consists of several consecutive stages:

Stage S0 performs comparison of String_1, String_2 and String_3. If all of them are identical, no further action regarding error detection and/or correction is needed. Else, the one or more of the further stages are performed.

In Stage S1 the length of the string is determined, which then helps to pinpoint the position of location data and of duration data in the string. Therefore, the software attempts to locate the "+" data byte in all three strings. A comparison of the "+" data byte location among the three different strings is done. Whichever two strings give the same "+" location, this location is determine therefrom in step S11. For example, if the position of the "+" data byte in String_1 and String_3 are both equal, for example at position 27, then the string length is deemed to be found.

If the position for the "+" data byte is for none of the strings the same, each string is revisited in step S12. It is then checked for the string that gives a "−" data byte at a location of a "+" data byte increased by five. This refers to the relative position of these data bytes in the correct string (see " . . . CCC+TTTT-JJ . . . "). If such is found, the length of the string is then determined. If such is not found, a check for further distance sequences of the "+" data byte and one or more "−" data bytes or distances between two or more "−" data bytes are checked. If a correct relative position is found the length of the string is thus determined from the respective positions in step S13. As there are many predefined positions for "−" data bytes, the likelihood of not successfully determining the length of the string is rather low.

In Stage S2 unwanted data after the last valid data is cleaned up, based on the previously determined length of string. As transmission of data does usually not terminate instantly, a few bytes of unwanted data may be recorded. These unwanted data are cleaned up in this stage.

In Stage S3 a byte level comparison is performed to check for two identical bytes of data. For example, at a location X, the String_1 data is "~", the String_2 data is "R", and the String_3 data is "R". In this case, due to majority vote in step S31, String_1 data at location X is replaced with "R".

That means: At all locations, whichever two string returns the same data that value will be taken as the correct data. Only if all the three values of the different strings at a certain location are different, Stage S4 is performed.

In Stage S4 it is searched for the most logical data:

1) Based on the string length as determined, the exact location of the important data segment is known. For example the data segment "PSSCCC- . . . -PSSCCC+TTTT" is deemed to be the most important of the whole string
ZCZC–WXR–EEE–PSSCCC–PSSCCC+TTTT–JJJH–HMM–LLLLLLLL–

2) If the disputed data location does not belong to the important segment, the error is ignored.

3) If the disputed data location does belong to the important segment, it is looked at all three data of the three strings respectively. It is then chosen the one that gives a meaningful data. Meaningful data, in this context, means a number (0-9), a minus ("–") or a plus ("+"), as the data segment to be regarded most important consists only of these elements. An example is given as follows:
ZCZC–WXR–EEE–018097–018101+0015–JJJHHMM–LLLLLLLL–

4) Reconstruction fails only ("no" as result of checking step S41) if no meaningful data can be identified.

5) If there is such a non-correctable error, it is know that a warning event was received, but that the data is too corrupted to allow correct deciphering.

6) An error message is output in step S6 only when strings of data are received but an error occurs in the correction. Else, the corrected data is output or further processed. The error message is preferably indicating that there was a warning issued but that the signal was too weak to give more details.

If there is correct data or the data could be corrected, it is decoded and the respective status information SI or audio warning signal AUW are output in step S7.

The method according the invention perfectly handles the following cases:
Three identical strings are received.
Two identical strings are received.
Corruption occurs at different locations of the strings.
Corruption occurs at the same location of the strings but at least one of the strings returns a meaningful value.
Corruption occurs at the same location of the string, none of the strings returns a meaningful value, but the location is not in an important segment.

FIG. 4 shows a flowchart of a second implementation of the inventive method. It starts with step S80. In step S81 it is checked for the sequence 'ZCZC' in each of the received strings. In case that it is not present, it is added in the front of the respective string. To indicate that the sequence "ZCZC" is checked, the string is shown close to step S81 in the figure whereby the relevant part is put in capital letters.

In step S82 it is searched for a recognizable event code EEE within the range where it is supposed to exist, i.e. from position 0 to 9 in the case of the standard mentioned above. If it is not at the correct position the position of the event code is readjusted. Here, too, the relevant part checked in this step is put in capital letters close to the step S82.

In step S83 it is checked for the number of 'pluses' i.e. for the occurrence of symbol "+" in each of the strings. A string having more than one 'plus' is considered erroneous. If more than two strings having more than one 'plus', it is assumed that the received strings are badly corrupted.

Using the longest length from the three received strings, it is checked in step S84 for the conditions as of steps S841 to S842 on the right.

If the string is longer than the length for a complete SAME data with a single location code, i.e. 40 characters long, then it is in step S841 deduced the number of transmitted locations from here.

If the string is shorter than the length for a string containing up to the position of the location code, i.e. 24 characters long, it is assumed in step S842 that the received strings are probably having errors in the location code segment.

If the string is shorter than the length for a string containing up to the event code, i.e. 12 characters long, it is assumed in step S843 that the received strings are probably having error in the event code segment.

In step S85 it is performed the following to decode the event code: It is checked that at the same position of the event code segment for all the three strings, it is an alphabet character. If at any position, all three strings return a non-alphabet character, it is assumed that no valid event code can be determined, otherwise, it is checked for the conditions of sub steps S851 to S853.

In step S851 two strings are compared at any one time. If both strings are having the same event code and, after checking through the database, if this event code is listed in the list, then it is taken as a valid event code. The list contained in the database indicates all possible events. For displaying the respective event, the list contains the event code as well as the respective full text version to be output as information for the user. Thus all allowed events are contained in this list.

If no two strings giving the same event code can be found, in step S852 each individual string is checked against the database. If any of these strings is found in the list, it is taken as the valid event code.

Otherwise it is concluded in step S853 that no valid event code can be determined.

In step S86 it is described how to decode the location code: Two strings are compared at any one time. If they return the same character at the same position in the location code segment, this character is taken as the correct data for this position after confirming that it is a digit character. Otherwise it is assumed that the string is having an error in the location code. The location code "PSSCC" is put in capital letters in the string close to steps S86 and S861 in the figure.

In step S861 it is described how the comparison is carried out on a location-by-location basis. The number of locations transmitted is determined from the earlier stage. This is done in this manner because the process is only focusing on the important data but not on the insignificant ones, such as the dash in-between the location codes.

In step S87 it is checked if immediately after the last location code, a 'plus' symbol "+" is present in the string. At least two strings must give the same result at this position. Otherwise it is assumed that the string is in error.

In steps S88 and S881 the same process as used in steps S86 and S861 to decode the location code is repeated here for decoding the duration code segment. At least two strings must give a similar character and it must be a digit. Otherwise, it is assumed the duration code is in error. Here, "TTTT" is put in capital letters in the string depicted close to step S881.

Finally in step S89 it is determined, from the error flags triggered from the earlier stages, if the string is having an unrecoverable error in the event code. In this case the received string is discarded totally. However, if it is only the location code that is in error, then the location and duration codes are defaulted to predetermined values. Thus the correct event with an indication of unrecoverable location and duration is output to the user.

The process ends in step S90.

The invention claimed is:

1. Method to decode a received data string in a processing device, said data string being part of a message containing non-data elements and data string elements of varying length, comprising the steps of:
   locating a predefined subset of the data string, said subset consisting of data string elements considered as most significant; and
   checking agreement of only said subset of repeated data string elements.

2. Method according to claim 1, comprising the steps of:
   determining the length of said data string;
   pinpointing predetermined data positions using said length;
   removing data from said data string starting from a position determined by said length.

3. Method according to claim 2, wherein the determining step consists in locating a predetermined sequence in said data string.

4. Method according to claim 1, further comprising the steps of:
   comparing, byte by byte, different data strings assumed to contain identical data;
   taking as correct data those bytes for which said comparison gives the result "identical".

5. Method according to claim 1, further comprising the steps of:
   locating a predefined important segment as significant part of the data strings remaining after the previous step;
   disregarding the data locations that do not belong to said important segment; and
   further checking only the important segments.

6. Method according to claim 1 comprising the further step of:
   searching for meaningful data in case that no correct data can be determined.

7. Method according to claim 1 comprising the further step of:
   searching for a predefined header code block; and
   attaching a header code block at the start of the received data string if no such header code block is found in the preceding step.

8. Method according to claim 1 comprising the further step of:
   checking for a predetermined set of symbols at a predetermined location of the data string; and
   inserting to or removing from the data string symbols so as to shift the predetermined location if the check of the previous step did locate them at a different position.

9. Device for performing a method according to claim 1.

10. Broadcast receiver being equipped with a device according to claim 9 or being provided for performing the method.

* * * * *